US010811959B1

(12) United States Patent
Shao

(10) Patent No.: US 10,811,959 B1
(45) Date of Patent: Oct. 20, 2020

(54) SWITCHED CAPACITOR VOLTAGE CONVERTER AND METHOD FOR OPERATING A SWITCHED CAPACITOR VOLTAGE CONVERTER

(71) Applicant: NXP B.V., Eindhoven (NL)

(72) Inventor: Bin Shao, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/409,644

(22) Filed: May 10, 2019

(51) Int. Cl.
*H02M 3/07* (2006.01)
*H02M 1/08* (2006.01)

(52) U.S. Cl.
CPC ............. *H02M 3/07* (2013.01); *H02M 1/08* (2013.01)

(58) Field of Classification Search
CPC ...... H02M 3/07; H02M 3/33569; H02M 1/08; H05B 45/10; H05B 45/37; H05H 2007/022
See application file for complete search history.

(56) References Cited

U.S. PATENT DOCUMENTS

| 7,612,603 | B1 | 11/2009 | Petricek et al. | |
|---|---|---|---|---|
| 8,710,903 | B2 * | 4/2014 | Oraw | G11C 5/147 327/337 |
| 9,419,509 | B2 | 8/2016 | Jarvinen et al. | |
| 10,014,775 | B1 | 7/2018 | Assaad et al. | |
| 2015/0311792 | A1 | 10/2015 | Amaro et al. | |
| 2017/0126120 | A1 | 5/2017 | Chakraborty et al. | |
| 2018/0004238 | A1 | 1/2018 | Shen et al. | |
| 2019/0028094 | A1 | 1/2019 | Reusch et al. | |

OTHER PUBLICATIONS

Notice of Allowance; U.S. Appl. No. 16/409,658; 9 pages (dated Feb. 3, 2020).
"NXP Type-C End-to-End Fast Charging 8 A Total Solution", Document No. E2EFAST8ATOTAL, Rev 0, 2 pages, 2018.
Analog Devices, "Fixed Ratio High Power Inductorless (Charge Pump) DC/DC Controller", Datasheet LTC7820, https://www.analog.com/en/products/ltc7820.html, retrieved from the internet, Apr. 30, 2019, 28 pages.
Notice of Allowance; U.S. Appl. No. 15/594,885; 5 pages (dated Aug. 18, 2020).

* cited by examiner

*Primary Examiner* — Sibin Chen

(57) ABSTRACT

Embodiments of switched capacitor voltage converters and methods for operating a switched capacitor voltage converter are disclosed. In an embodiment, a switched capacitor voltage converter includes serially connected switching devices, a voltage generator connected to the serially connected switching devices and configured to generate driver voltages in response to a first voltage at a first terminal that is connected to the serially connected switching devices, and voltage drivers configured to drive the serially connected switching devices based on the driver voltages.

18 Claims, 13 Drawing Sheets

SWITCHED CAPACITOR VOLTAGE CONVERTER AND METHOD FOR OPERATING A SWITCHED CAPACITOR VOLTAGE CONVERTER

BACKGROUND

A voltage converter can be used to convert an input voltage into a desired output voltage. For example, a direct current (DC)-DC converter can be used to convert an input DC voltage into a desired output DC voltage. A switched capacitor voltage converter may use a combination of one or more switching devices and one or more capacitors to convert an input voltage into a desired output voltage. However, extra capacitors take up additional substrate area, may increase component costs, and may require more electrical terminals (e.g., pins) in a packaged semiconductor chip.

SUMMARY

Embodiments of switched capacitor voltage converters and methods for operating a switched capacitor voltage converter are disclosed. In an embodiment, a switched capacitor voltage converter includes serially connected switching devices, a voltage generator connected to the serially connected switching devices and configured to generate driver voltages in response to a first voltage at a first terminal that is connected to the serially connected switching devices, and voltage drivers configured to drive the serially connected switching devices based on the driver voltages. Other embodiments are also described.

In an embodiment, the voltage drivers include a first voltage driver configured to drive a first switching device of the serially connected switching devices based on a first driver voltage, second and third voltage drivers configured to drive second and third switching devices of the serially connected switching devices based on a second driver voltage, and a fourth voltage driver configured to drive a fourth switching device of the serially connected switching devices based on a third driver voltage.

In an embodiment, the voltage generator includes switches connected to a plurality of terminals having the first and second driver voltages, the input voltage, and an output voltage of the switched capacitor voltage converter.

In an embodiment, the switched capacitor voltage converter further includes capacitors electrically connectable to the terminals.

In an embodiment, the switches include a first switch connected to a first terminal having the first driver voltage and to a second terminal, a second switch connected to a third terminal having the second driver voltage and to the second terminal, a third switch connected to the second terminal and to the third driver voltage, a fourth switch connected to a fourth terminal and to a reference voltage, a fifth switch connected to the fourth terminal and to a fifth terminal having the input voltage, and a sixth switch connected to the fourth terminal and to a sixth terminal having the output voltage.

In an embodiment, the switched capacitor voltage converter further includes a first capacitor electrically connectable to the first terminal, a second capacitor electrically connectable to the third terminal, and a third capacitor electrically connectable to the second terminal and to the fourth terminal.

In an embodiment, the voltage generator includes switches connected to a plurality of terminals having the first driver voltage and the input voltage of the switched capacitor voltage converter.

In an embodiment, the switched capacitor voltage converter further includes capacitors electrically connectable to the terminals.

In an embodiment, the switches include a first switch connected to a first terminal having the first driver voltage and to a second terminal, a second switch connected to the second terminal and to the third driver voltage, a third switch connected to a third terminal and to a reference voltage, and a fourth switch connected to the third terminal and to a fourth terminal having the input voltage.

In an embodiment, the switched capacitor voltage converter further includes a first capacitor electrically connectable to the first terminal, a second capacitor electrically connectable to the second terminal and to the third terminal, and a third capacitor electrically connectable to the fourth terminal.

In an embodiment, the first, second, third, and fourth voltage drivers are connected to gate terminals of the first, second, third, and fourth switching devices respectively.

In an embodiment, a switched capacitor voltage converter include serially connected N-type transistors, a voltage generator connected to the serially connected N-type transistors and configured to generate a plurality of driver voltages in response to an input voltage at an input terminal that is connected to the serially connected N-type transistors, and voltage drivers configured to drive the serially connected N-type transistors based on the driver voltages.

In an embodiment, the voltage drivers are connected to gate terminals of the serially connected N-type transistors respectively.

In an embodiment, the voltage drivers include a first voltage driver configured to drive a first N-type transistor based on a first driver voltage, second and third voltage drivers configured to drive second and third N-type transistors based on a second driver voltage, and a fourth voltage driver configured to drive a fourth N-type transistor based on a third driver voltage.

In an embodiment, the voltage generator includes switches connected to a plurality of terminals having the first driver voltage and the input voltage of the switched capacitor voltage converter.

In an embodiment, the switched capacitor voltage converter further includes capacitors electrically connectable to the terminals.

In an embodiment, the switches include a first switch connected to a first terminal having the first driver voltage and to a second terminal, a second switch connected to the second terminal and to the third driver voltage, a third switch connected to a third terminal and to a reference voltage, and a fourth switch connected to the third terminal and to a fourth terminal having the input voltage.

In an embodiment, the switched capacitor voltage converter further includes a first capacitor electrically connectable to the first terminal, a second capacitor electrically connectable to the second terminal and to the third terminal, and a third capacitor electrically connectable to the fourth terminal.

In an embodiment, a method for operating a switched capacitor voltage converter involves generating driver voltages in response to an input voltage at an input terminal that is connected to serially connected switching devices of the switched capacitor voltage converter and driving the serially connected switching devices based on the driver voltages.

In an embodiment, generating the driver voltages in response to the input voltage involves generating the driver voltages in response to the input voltage using a plurality of capacitors that are not directly connected to the serially connected switching devices.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
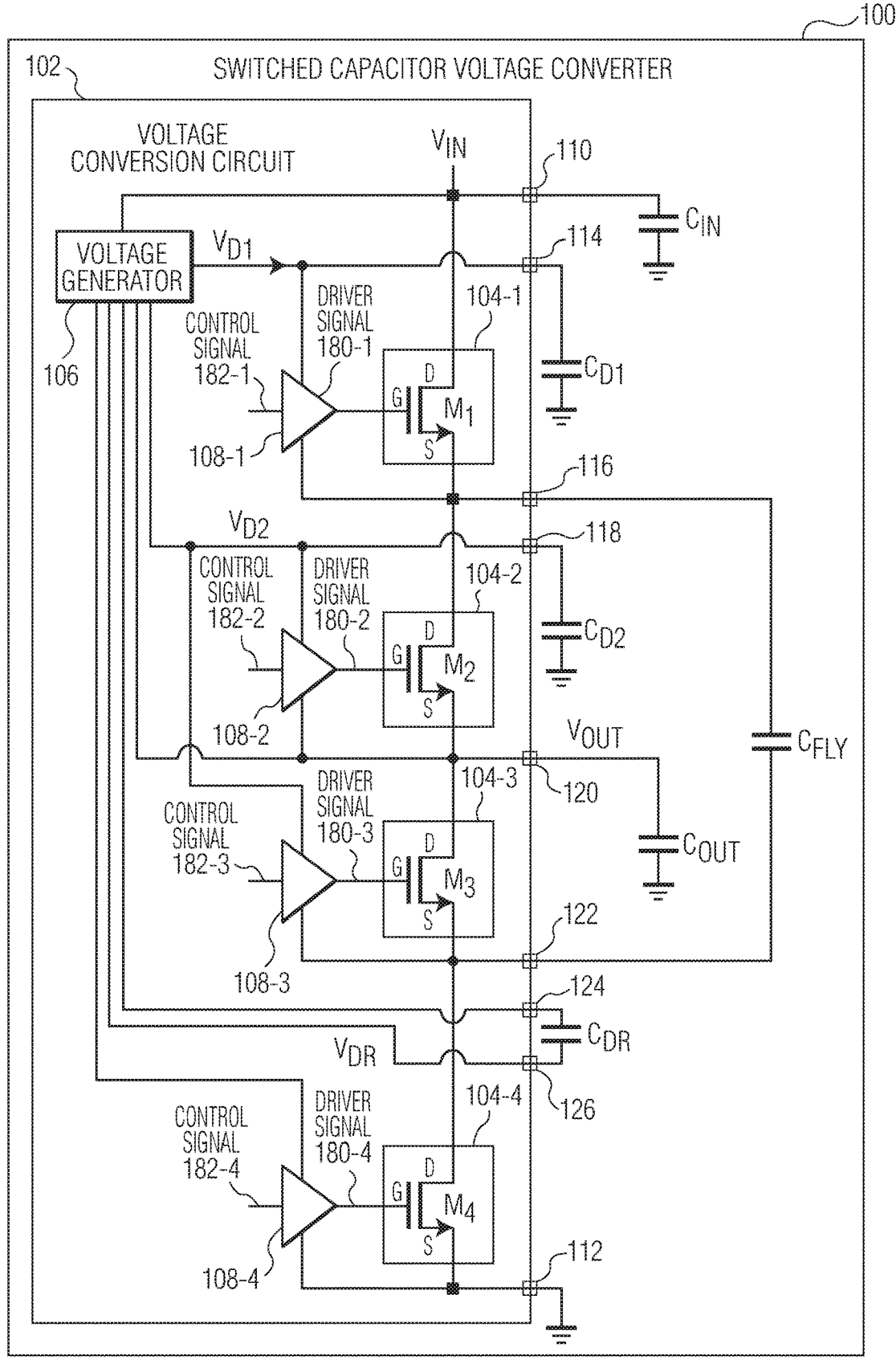
FIG. 1 is a schematic block diagram of a switched capacitor voltage converter in accordance with a first embodiment of the invention.

FIG. 1 is a schematic block diagram of a switched capacitor voltage converter 100 in accordance with a first embodiment of the invention. The switched capacitor voltage converter converts an input voltage, $V_{IN}$, into a desired output voltage, $V_{OUT}$. The switched capacitor voltage converter can be used in various applications, such as automotive applications, communications applications, industrial applications, medical applications, computer applications, and/or consumer or appliance applications. In the embodiment depicted in FIG. 1, the switched capacitor voltage converter includes a voltage conversion circuit 102, an input capacitor, "$C_{IN}$," a flyover capacitor, "$C_{FLY}$," an output capacitor, "$C_{OUT}$" and driver capacitors, "$C_{D1}$," "$C_{D2}$," and "$C_{DR}$." The voltage conversion circuit 102 includes serially connected switching devices 104-1, 104-2, 104-3, 104-4, a voltage generator 106 connected to the serially connected switching devices, and voltage drivers 108-1, 108-2, 108-3, 108-4. The flyover capacitor, $C_{FLY}$, the input capacitor, $C_{IN}$, and the output capacitor, $C_{OUT}$, may be external capacitors to the voltage conversion circuit. In some embodiments, the flyover capacitor, $C_{FLY}$, has a capacitance value that is between 1 μF and 100 μF, and the output capacitor, $C_{OUT}$, has a capacitance value that is between 1 μF and 100 μF. In some embodiments, the switched capacitor voltage converter is included in a computing device, such as a smartphone, a tablet computer, a laptop, etc. In some embodiments, at least some of the components of the switched capacitor voltage converter are implemented in a substrate, such as a semiconductor wafer or a printed circuit board (PCB). In an embodiment, at least some of the components of the switched capacitor voltage converter are packaged as a stand-alone semiconductor IC chip. Although the switched capacitor voltage converter is shown in FIG. 1 as including certain circuit elements, in other embodiments, the switched capacitor voltage converter may include one or more additional circuit elements. For example, the switched capacitor voltage converter may include more than four switching devices or less than four switching devices in other embodiments. In another example, the switched capacitor voltage converter may include more than four voltage drivers or less than four voltage drivers in other embodiments.

In some embodiments, the voltage conversion circuit 102 is implemented in a substrate and is packaged as a stand-alone semiconductor IC device or chip. In these embodiments, the driver capacitors, $C_{D1}$, $C_{D2}$, and $C_{DR}$, are external capacitors to the voltage conversion circuit. For example, N-type high voltage transistors, e.g., N-channel lateral diffused MOS (NLDMOS) transistors, can be used in the voltage conversion circuit for better power efficiency. However, due to the size of N type transistors, driver capacitors are typically not integrated with these transistors (i.e., integrated onto the same substrate as the transistors). In a conventional switched capacitor voltage converter, each switching device of a voltage conversion circuit is electrically connected to a separate bootstrap capacitor. Consequently, multiple external bootstrap capacitors are used in a conventional switched capacitor voltage converter. However, extra capacitors occupy additional substrate area, may add component costs, and may require more electrical terminals (e.g., pins) in a packaged voltage conversion circuit, which can increase the dimensions as well as the component cost of the packaged voltage conversion circuit. For example, for a dual-phase switched capacitor voltage converter in which each switching device of a voltage conversion circuit is electrically connected to an external bootstrap capacitor, five external capacitors and five extra terminals (e.g., pins) may be needed, even assuming the middle bootstrap capacitor is reused. In contrast, the voltage conversion circuit 102 of the switched capacitor voltage converter 100 depicted in FIG. 1 uses no external bootstrap capacitors. Consequently, compared to a voltage conversion circuit of a switched capacitor voltage converter in which each switching device of the voltage conversion circuit is electrically connected to an external bootstrap capacitor, the voltage conversion circuit 102 depicted in FIG. 1 does not need terminals (e.g., pins) for connecting to external bootstrap capacitors.

In the embodiment depicted in FIG. 1, a packaged IC device of the voltage conversion circuit 102 includes nine terminals/pins, a $V_{IN}$ (supply voltage) terminal/pin 110, a reference terminal/pin (e.g., GND (ground) terminal/pin) 112, a terminal/pin 114 that is electrically connectable to the driver capacitor, $C_{D1}$, a terminal/pin 116 between the transistors, M1, M2, which is electrically connectable to the flyover capacitor, $C_{FLY}$, a terminal/pin 118 that is electrically connectable to the driver capacitor, $C_{D2}$, a terminal/pin 120 between the transistors, M2, M3, which is electrically connectable to the output capacitor, $C_{OUT}$, a terminal/pin 122 between the transistors, M3, M4, which is electrically connectable to the flyover capacitor, $C_{FLY}$, and terminals/pins 124, 126 that are electrically connectable to the driver capacitor, $C_{DR}$.

In the embodiment depicted in FIG. 1, the serially connected switching devices 104-1, 104-2, 104-3, 104-4 are electrically connected to the terminal 110 having the input voltage, $V_{IN}$, and to the terminal 112 having a reference voltage that is lower than the input voltage, $V_{IN}$. In some embodiments, the reference voltage is ground (0 volt). In the embodiment depicted in FIG. 1, the serially connected switching devices are implemented as N-type transistors, M1, M2, M3, M4, such as, NLDMOS transistors, for better power efficiency. However, in other embodiments, the switching devices may be implemented by other semiconductor devices. In the embodiment depicted in FIG. 1, the drain terminal, D, of the transistor, M1, is connected to the input voltage, $V_{IN}$, the source terminal, S, of the transistor, M1, is connected to the drain terminal, D, of the transistor, M2, the source terminal, S, of the transistor, M2, is connected to the drain terminal, D, of the transistor, M3, the source terminal, S, of the transistor, M3, is connected to the drain terminal, D, of the transistor, M4, and the source terminal, S, of the transistor, M4, is connected to a reference voltage (e.g., ground). In the embodiment depicted in FIG. 1, the driver capacitors, $C_{D1}$, $C_{D2}$, and $C_{DR}$, are not directly connected to the N-type transistors, M1, M2, M3, M4, and are not bootstrap capacitors for the N-type transistors, M1, M2, M3, M4.

In the embodiment depicted in FIG. 1, the voltage generator 106 is electrically connected to the serially connected switching devices 104-1, 104-2, 104-3, 104-4 and configured to generate driver voltages, "$V_{D1}$," "$V_{D2}$," "$V_{DR}$," in response to the input voltage, $V_{IN}$, at the terminal 110.

Figure 2:
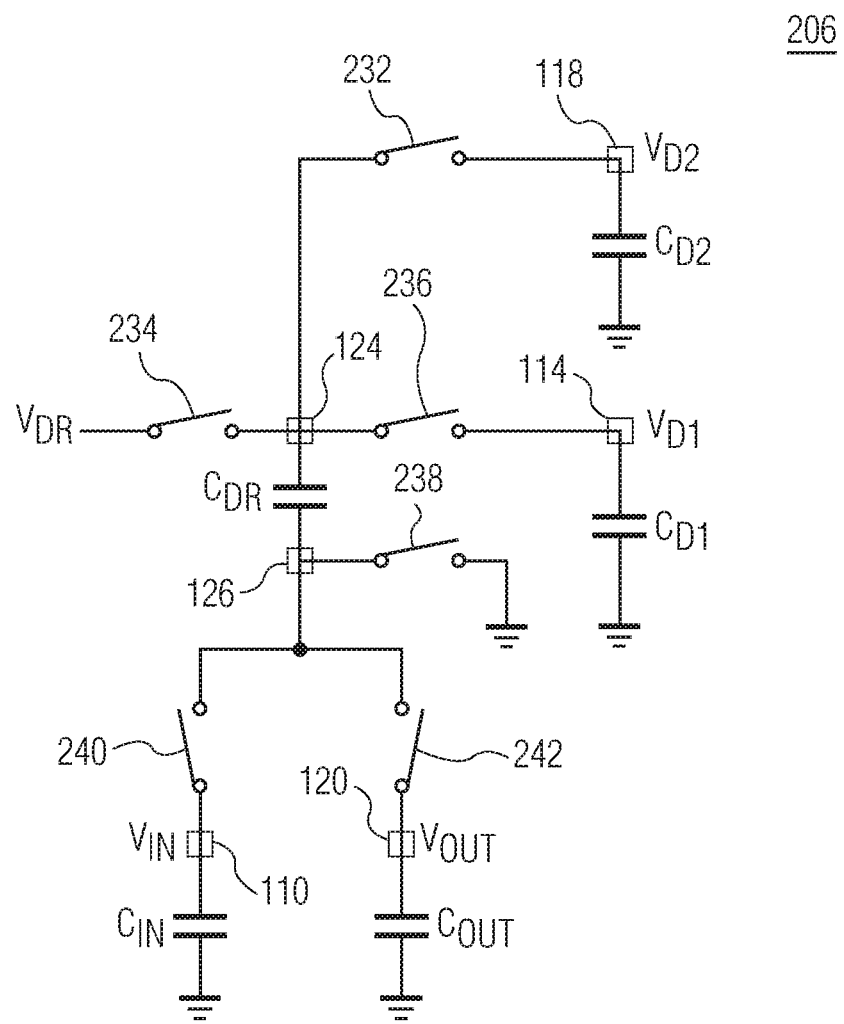
FIG. 2 depicts an embodiment of a voltage generator of the switched capacitor voltage converter depicted in FIG. 1.

FIG. 2 depicts a voltage generator 206, which is an embodiment of the voltage generator 106 depicted in FIG. 1. The voltage generator 206 depicted in FIG. 2 is one possible embodiment of the voltage generator 106 depicted in FIG. 1. However, the voltage generator 106 depicted in FIG. 1 is not limited to the embodiment shown in FIG. 2. The voltage generator can use the floating capacitor, $C_{DR}$, to charge both the driver voltages, $V_{D1}$, $V_{D2}$, in a time multiplex manner. In the embodiment depicted in FIG. 2, the voltage generator 206 includes switches 232, 234, 236, 238, 240, 242 connected to terminals/pins 110, 120, 114, 118, 124, 126 having the driver voltages, $V_{D1}$, $V_{D2}$, the input voltage, $V_{D1}$, and the output voltage, $V_{OUT}$, of the switched capacitor voltage converter. The driver capacitors, $C_{D1}$, $C_{D2}$, and $C_{DR}$, the input capacitor, $C_{IN}$, and the output capacitor, $C_{OUT}$, are electrically connectable to the terminals/pins 110, 120, 114, 118, 124, 126. The switch 236 is connected to the terminal 114 having the driver voltage, $V_{D1}$, and to the terminal 124. The switch 232 is connected to the terminal 118 having the driver voltage, $V_{D2}$, and to the terminal 124. The switch 234 is connected to the terminal 124 and to the driver voltage, $V_{DR}$. The switch 238 is connected to the terminal 126 and to a reference voltage (e.g., ground). The switch 240 is connected to the terminal 126 and to the terminal 110 having the input voltage, $V_{IN}$. The switch 242 is connected to the terminal 126 and to the terminal 120 having the output voltage, $V_{OUT}$. The capacitor, $C_{D1}$, is electrically connectable to the terminal 114, the capacitor, $C_{D2}$, is electrically connectable to the terminal 118, and the capacitor, $C_{DR}$, is electrically connectable to the terminals 124, 126. The input capacitor, $C_{IN}$, is electrically connectable to the terminal 110 and a reference voltage (e.g., ground). The input capacitor, $C_{OUT}$, is electrically connectable to the terminal 120 and a reference voltage (e.g., ground). The switches 232, 234, 236, 238, 240, 242 can be controlled to refresh and/or charge at least one of the driver capacitors, $C_{D1}$, $C_{D2}$, and $C_{DR}$. In some embodiments, the voltage generator 206 includes one or more processors, such as microcontrollers or central processing units (CPUs) configured to control the switches 232, 234, 236, 238, 240, 242.

Figure 3A:
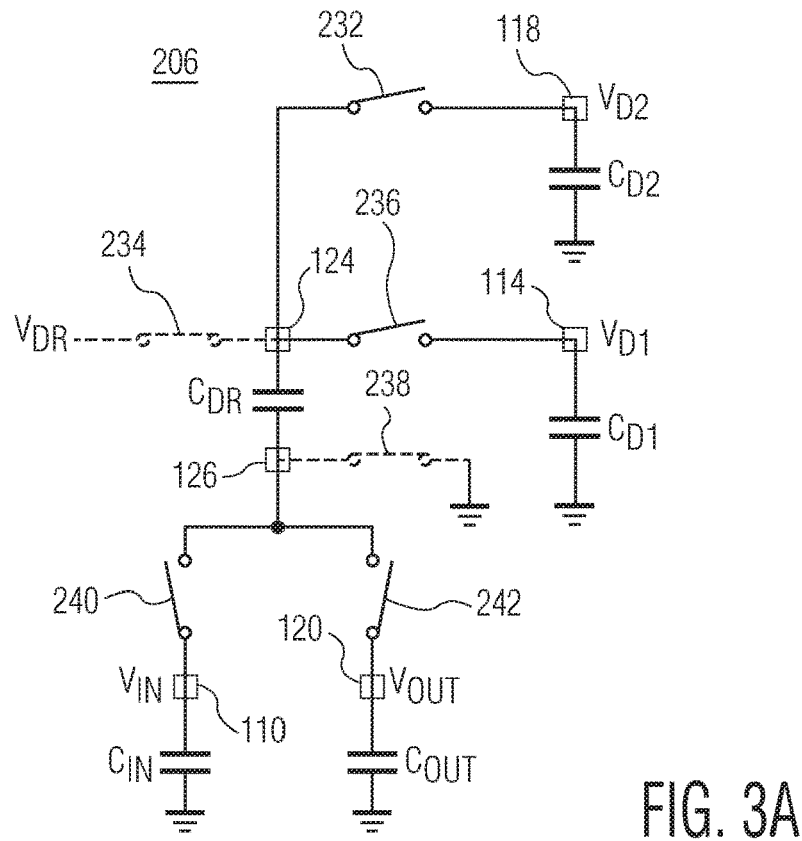
FIGS. 3A-3D illustrate switching stages/phases of the voltage generator depicted in FIG. 2.

In an example operation of the voltage generator 206, the voltage generator operates in four stages/phases. FIGS. 3A-3D illustrate switching stages/phases of the voltage generator depicted in FIG. 2. Specifically, FIG. 3A illustrates a first stage of the voltage generator. In the first stage, the driver capacitor, $C_{DR}$, is refreshed. As illustrated in FIG. 3A, the switches 234, 238 are closed (i.e., conductive) and the switches 232, 236, 240, 242 are open (i.e., non-conductive).

Figure 3B:
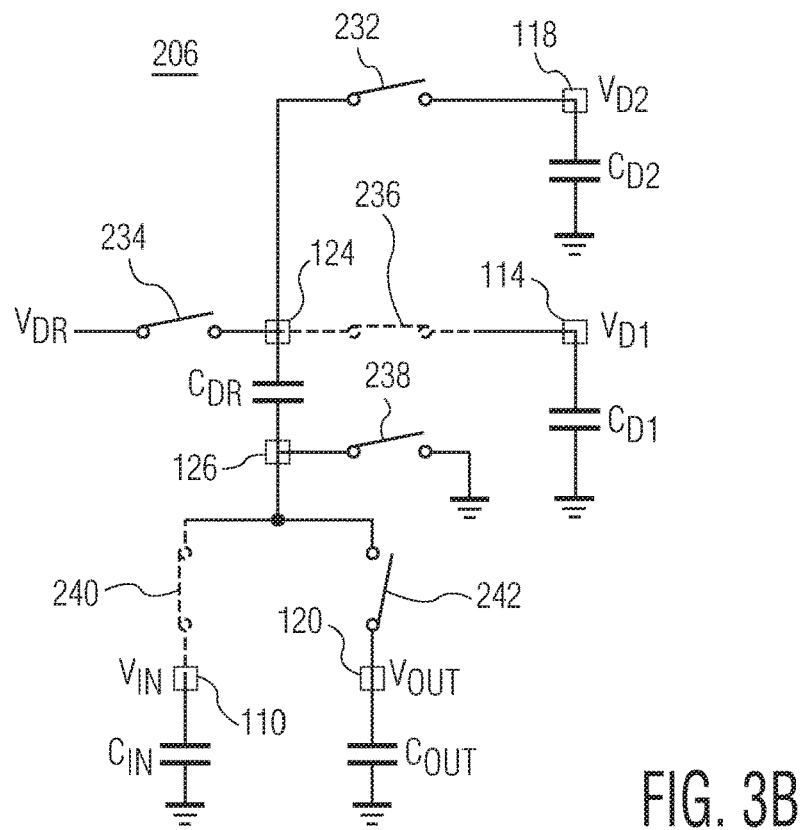

FIG. 3B illustrates a second stage of the voltage generator 206. In the second stage, the driver capacitor, $C_{D1}$, is charged. As illustrated in FIG. 3B, the switches 236, 240 are closed (i.e., conductive) and the switches 232, 234, 238, 242 are open (i.e., non-conductive).

Figure 3C:
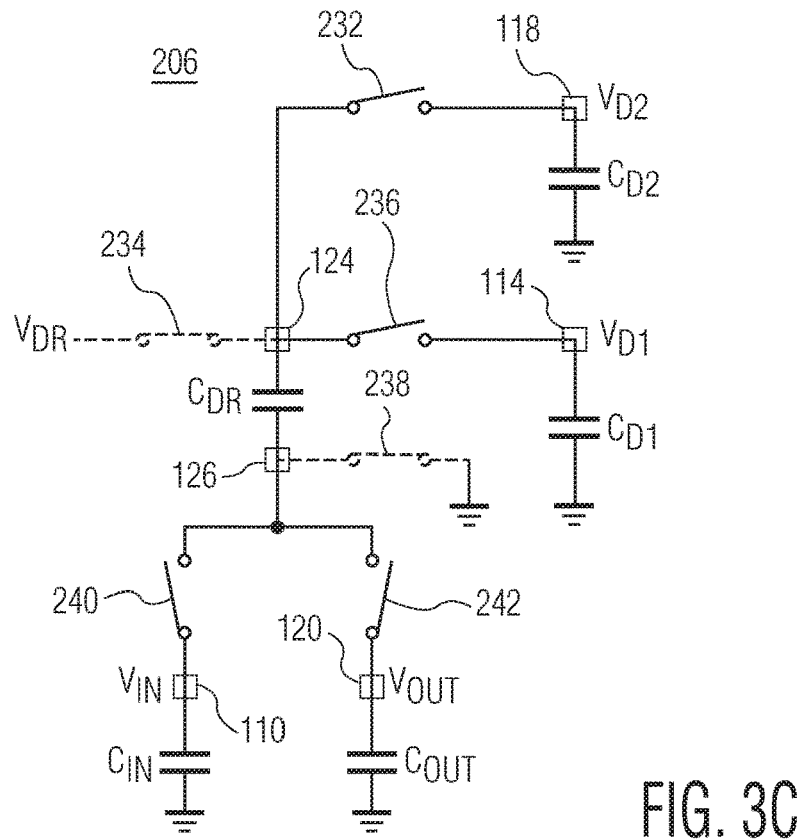

FIG. 3C illustrates a third stage of the voltage generator 206. In the third stage, the driver capacitor, $C_{DR}$, is refreshed. As illustrated in FIG. 3C, the switches 234, 238 are closed (i.e., conductive) and the switches 232, 236, 240, 242 are open (i.e., non-conductive).

Figure 3D:
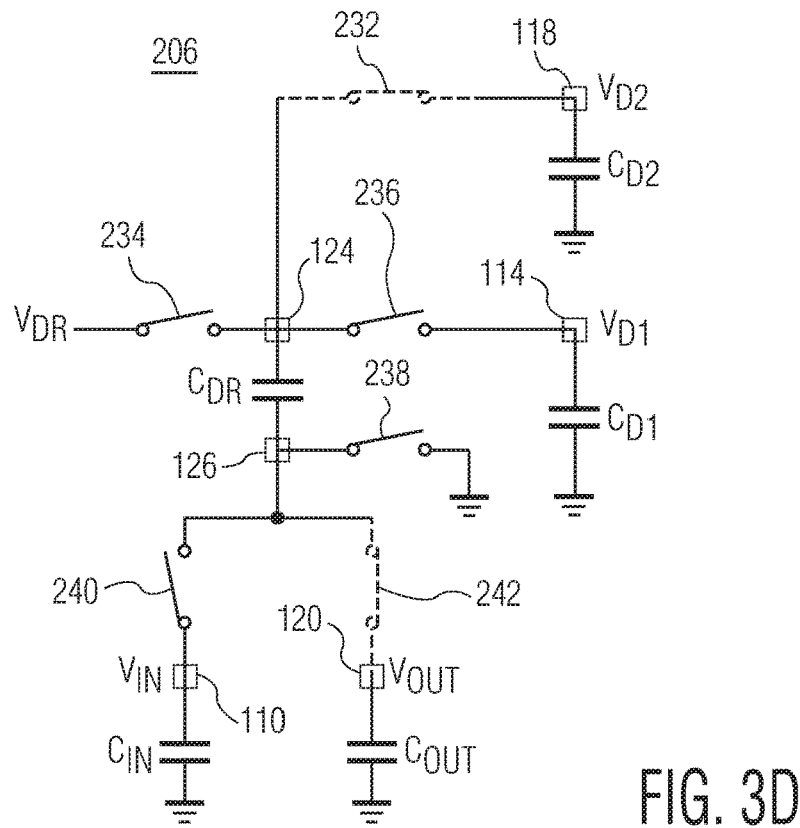

FIG. 3D illustrates a fourth stage of the voltage generator 206. In the fourth stage, the driver capacitor, $C_{D2}$, is charged. As illustrated in FIG. 3D, the switches 232, 242 are closed (i.e., conductive) and the switches 234, 236, 238, 242 are open (i.e., non-conductive).

Turning back to FIG. 1, the voltage drivers 108-1, 108-2, 108-3, 108-4 are configured to drive the switching devices 104-1, 104-2, 104-3, 104-4 with driver signals 180-1, 180-2, 180-3, 180-4 in response to control signals 182-1, 182-2, 182-3, 182-4. The voltage driver 108-1 is configured to drive the transistor, M1, based on the output voltage, $V_{D1}$, which is generated by the voltage generator 106. The voltage drivers 108-2, 108-3 are configured to drive the transistors, M2, M3, based on the output voltage, $V_{D2}$, which is generated by the voltage generator. The voltage driver 108-4 is configured to drive the transistor, M4, of based on a driver voltage, $V_{DR}$, which is generated by the voltage generator. When the serially connected switching devices are implemented as N-type transistors, M1, M2, M3, M4, the voltage drivers 108-1, 108-2, 108-3, 108-4 are electrically connected to gate terminals, G, of the transistors, M1, M2, M3, M4, respectively. The voltage drivers 108-1, 108-2, 108-3, 108-4 can be implemented using known driver circuits.

Figure 4:
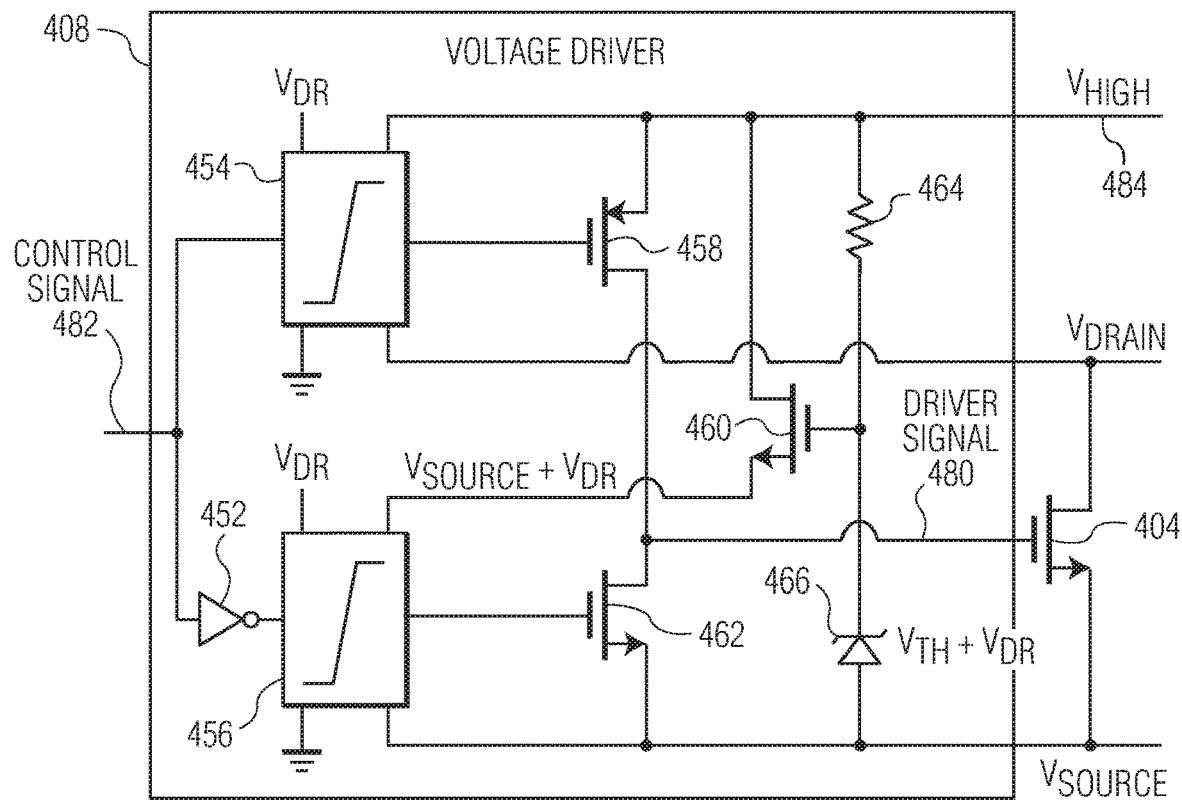
FIG. 4 depicts an embodiment of a voltage driver of the switched capacitor voltage converter depicted in FIG. 1.

FIG. 4 depicts a voltage driver 408, which is an embodiment of the voltage drivers 108-1, 108-3 depicted in FIG. 1. The voltage driver 408 depicted in FIG. 4 is one possible embodiment of the voltage drivers 108-1, 108-3 depicted in FIG. 1. However, the voltage drivers 108-1, 108-3 depicted in FIG. 1 are not limited to the embodiment shown in FIG. 4. In the embodiment depicted in FIG. 4, the voltage driver 408 includes an inverter 452, voltage level shifters 454, 456, transistors 458, 460, 462, a resistor 464, and a diode 466. The voltage driver is configured to generate a driver signal 480 for a transistor 404, which may be the transistor M1, in FIG. 1 or the transistor, M3 in FIG. 1, in response to a control signal 482 based on a voltage signal, $V_{HIGH}$, 484, which can be the output voltage, $V_{D1}$, or $V_{D2}$, which is generated by the voltage generator 106.

Figure 5:
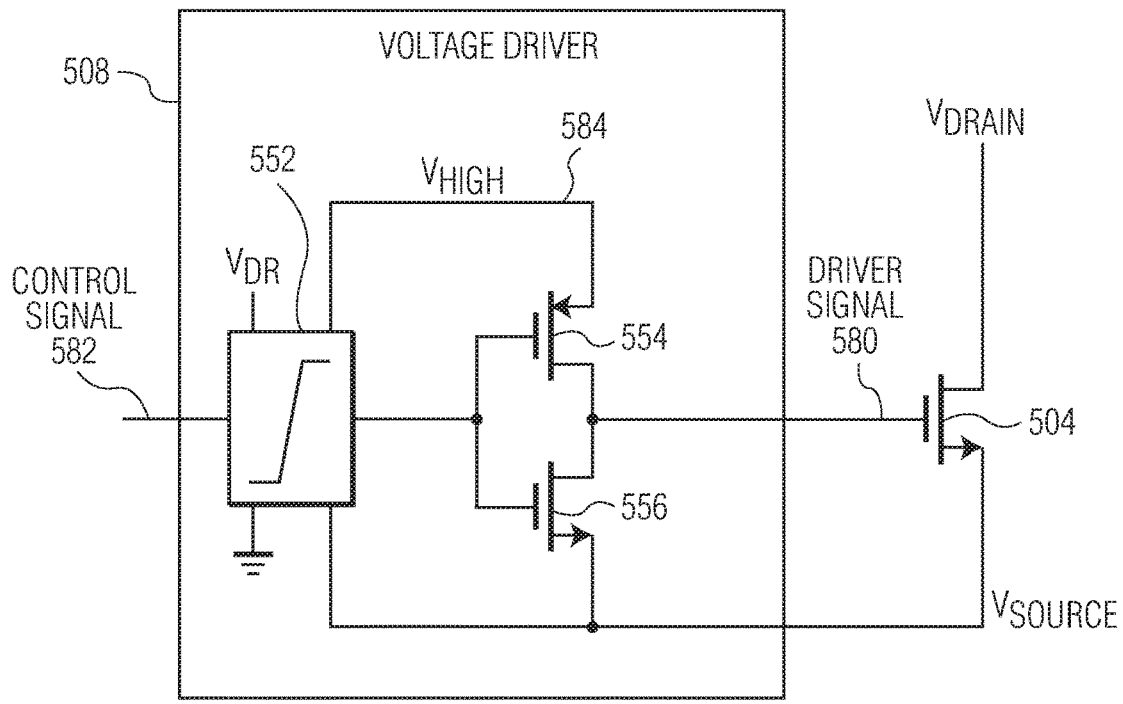
FIG. 5 depicts another embodiment of a voltage driver of the switched capacitor voltage converter depicted in FIG. 1.

FIG. 5 depicts a voltage driver 508, which is an embodiment of the voltage drivers 108-2, 108-4 depicted in FIG. 1. The voltage driver 508 depicted in FIG. 5 is one possible embodiment of the voltage drivers 108-2, 108-4 depicted in FIG. 1. However, the voltage drivers 108-2, 108-4 depicted in FIG. 1 are not limited to the embodiment shown in FIG. 5. In the embodiment depicted in FIG. 5, the voltage driver 508 includes a voltage level shifter 552 and transistors 554, 556. The voltage driver is configured to generate a driver signal 580 for a transistor 504, which may be the transistor M2, in FIG. 1 or the transistor, M4 in FIG. 1, in response to a control signal 582 based on a voltage signal, $V_{HIGH}$, 584, which can be the output voltage, $V_{D2}$, or $V_{DR}$, which is generated by the voltage generator 106.

Figure 6:
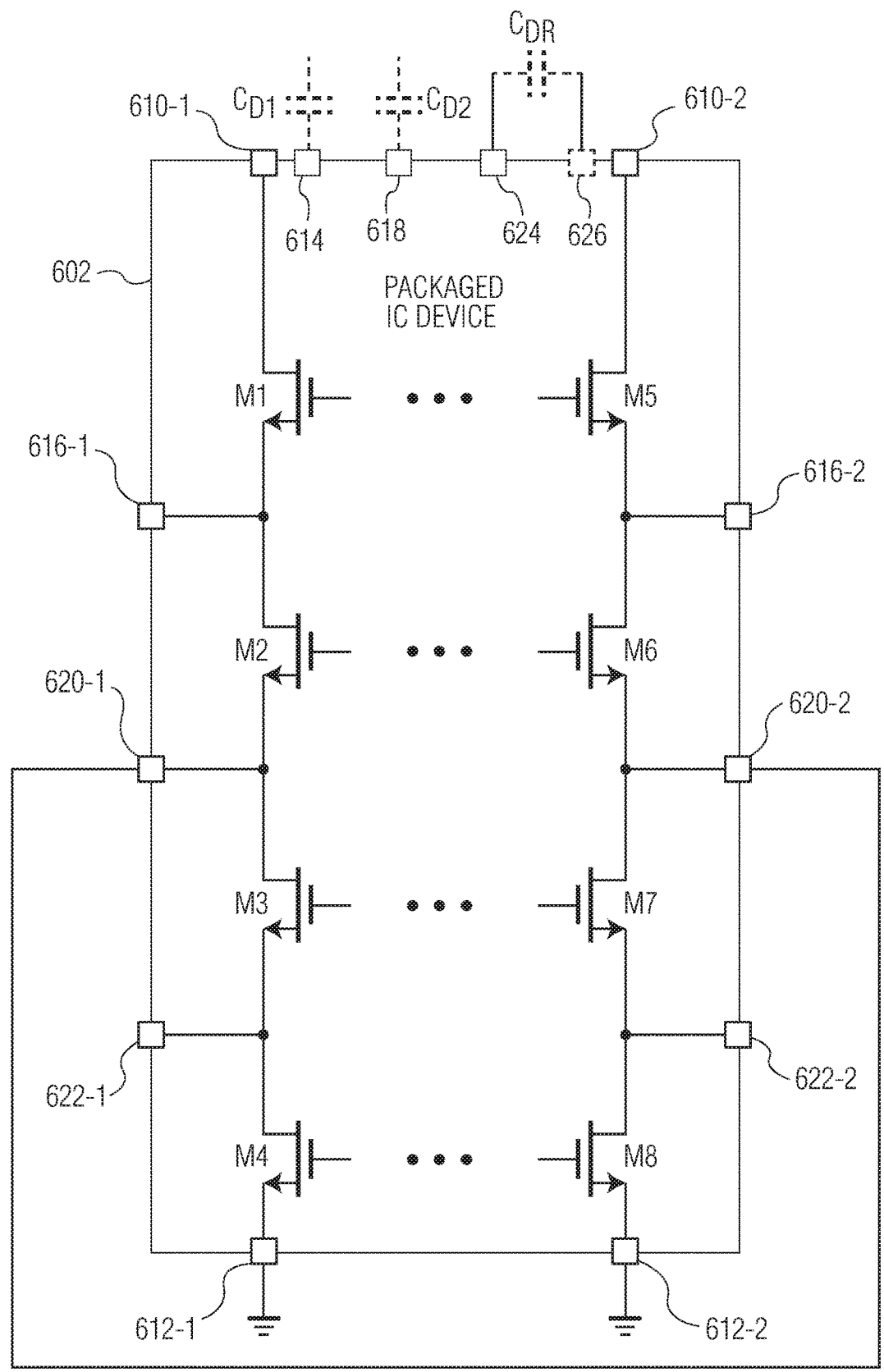
FIG. 6 depicts a terminal/pin configuration of a dual-phase voltage conversion circuit.

For an N-phase (N being a positive integer) switched capacitor voltage converter in accordance with an embodiment of the invention, no bootstrap capacitors are used. Consequently, no terminals/pins are used for electrical connections between bootstrap capacitors and a packaged IC device of an N-phase voltage conversion circuit. For an N-phase voltage conversion circuit in which each switching device is electrically connected to an external bootstrap capacitor, a total of 2N+1 terminals/pins are used for electrical connection to bootstrap capacitors, even if the middle bootstrap capacitor is reused. Consequently, compared to an N-phase voltage conversion circuit in which each switching device is electrically connected to a separate bootstrap capacitor, an N-phase (N being a positive integer) switched capacitor voltage converter in accordance with an embodiment of the invention uses three external capacitors and four terminals/pins for electrical connection to the three external capacitors. FIG. 6 depicts a terminal/pin configuration of a dual-phase voltage conversion circuit 602 that is embodied as a packaged IC device. As shown in FIG. 6, the packaged IC device of the dual-phase voltage conversion circuit includes twelve terminals/pins, which are two $V_{IN}$ (supply voltage) terminals/pins 610-1, 610-2, two GND (ground) terminals/pins 612-1, 612-2, a terminal/pin 616-1 between the transistors, M1, M2, which is electrically connectable to a corresponding flyover capacitor, a terminal/pin 620-1 between the transistors, M2, M3, which is electrically connectable to a corresponding output capacitor, a terminal/pin 622-1 between the transistors, M3, M4, which is electrically connectable to the corresponding flyover capacitor, a terminal/pin 616-2 between the transistors, M5, M6, which is electrically connectable to a corresponding flyover capacitor, a terminal/pin 620-2 between the transistors, M6, M7, which is electrically connectable to a corresponding output capacitor and may be connected to the terminal/pin 620-1, a terminal/pin 622-2 between the transistors, M7, M8, which is electrically connectable to the corresponding flyover capacitor, a terminal/pin 614 that is electrically connectable to the driver capacitor, $C_{D1}$, a terminal/pin 618 that is electrically connectable to the driver capacitor, $C_{D2}$, and terminals/pins 624, 626 that are electrically connectable to the driver capacitor, $C_{DR}$. For a dual-phase voltage conversion circuit in which each switching device is electrically connected to a separate bootstrap capacitor, a total of fifteen terminals/pins and five external bootstrap capacitors are used, even if the middle bootstrap capacitor is reused. In contrast, the dual-phase voltage conversion circuit depicted in FIG. 6 uses fourteen terminals/pins and three external driver capacitors. Consequently, compared to a dual-phase voltage conversion circuit in which each switching device is electrically connected to a separate bootstrap capacitor, the dual-phase voltage conversion circuit depicted in FIG. 6 uses one less terminal/pin and two less external capacitors. Consequently, compared to a dual-phase voltage conversion circuit in which each switching device is electrically connected to a separate bootstrap capacitor, the dual-phase voltage conversion circuit depicted in FIG. 6 can have smaller dimension and lower component cost.

Figure 7:
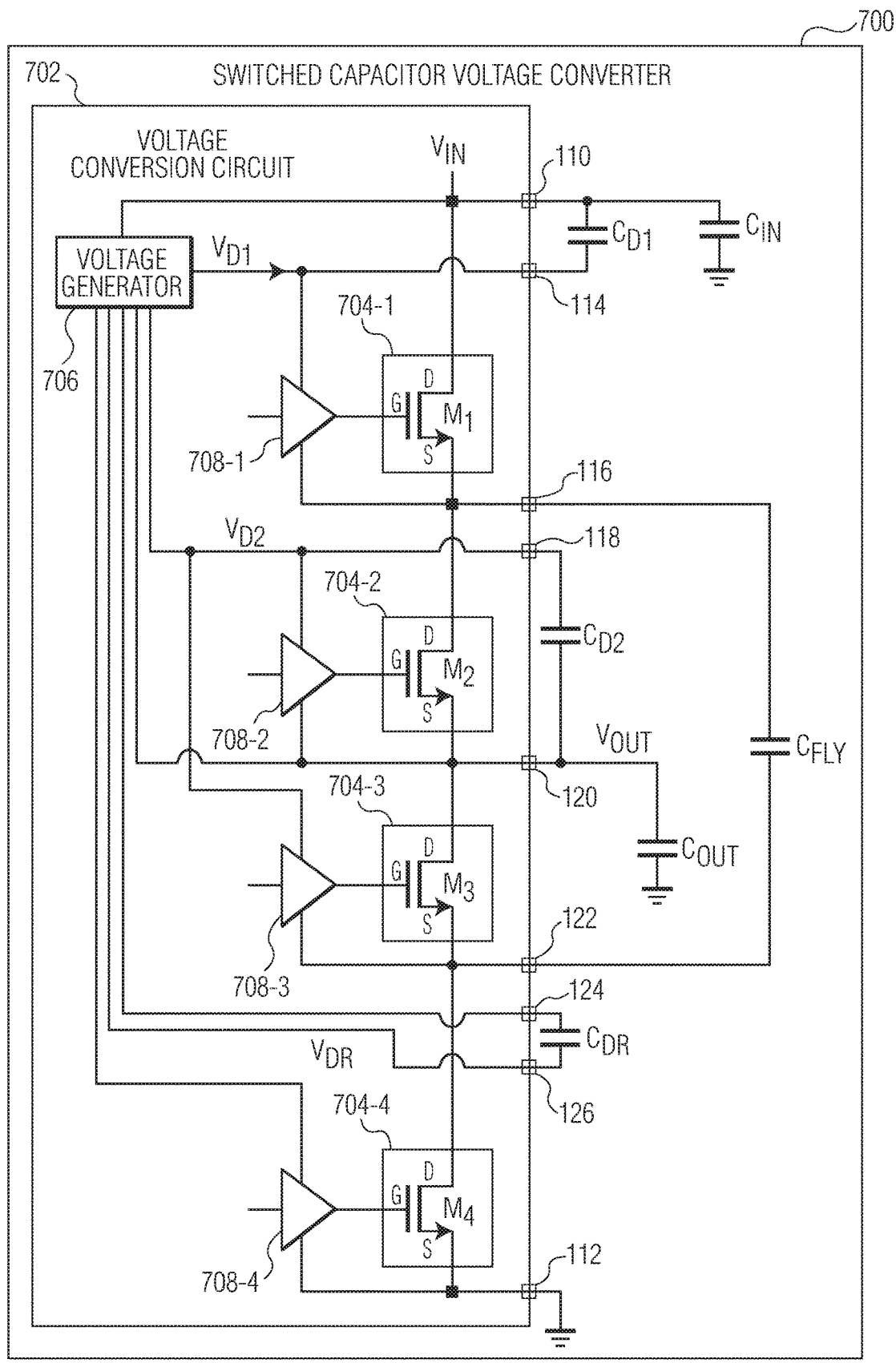
FIG. 7 is a schematic block diagram of a switched capacitor voltage converter in accordance with a second embodiment of the invention.

FIG. 7 is a schematic block diagram of a switched capacitor voltage converter 700 in accordance with a second embodiment of the invention. In the embodiment depicted in FIG. 7, the switched capacitor voltage converter includes a voltage conversion circuit 702, which includes serially connected switching devices 704-1, 704-2, 704-3, 704-4 that are implemented by transistors, M1, M2, M3, M4, a voltage generator 706 connected to the serially connected switching devices, and voltage drivers 708-1, 708-2, 708-3, 708-4, the input capacitor, $C_{IN}$, the flyover capacitor, $C_{FLY}$, an output capacitor, $C_{OUT}$, and the driver capacitors, $C_{D1}$, $C_{D2}$, and $C_{DR}$. The voltage conversion circuit 702, the switching devices 704-1, 704-2, 704-3, 704-4, the voltage generator 706, and the voltage drivers 708-1, 708-2, 708-3, 708-4 in the embodiment depicted in FIG. 7 are similar to or the same as the voltage conversion circuit 102, the switching devices 104-1, 104-2, 104-3, 104-4, the voltage generator 106, and the voltage drivers 108-1, 108-2, 108-3, 108-4 in the embodiment depicted in FIG. 1. A difference between the switched capacitor voltage converter 700 depicted in FIG. 7 and the switched capacitor voltage converter 100 depicted in FIG. 1 is that the bottom plate of the driver capacitors, $C_{D1}$, is connected to the input voltage, $V_{IN}$, rather than ground and the bottom plate of the driver capacitors, $C_{D2}$, is connected to the output voltage, $V_{OUT}$, rather than ground.

Figure 8:
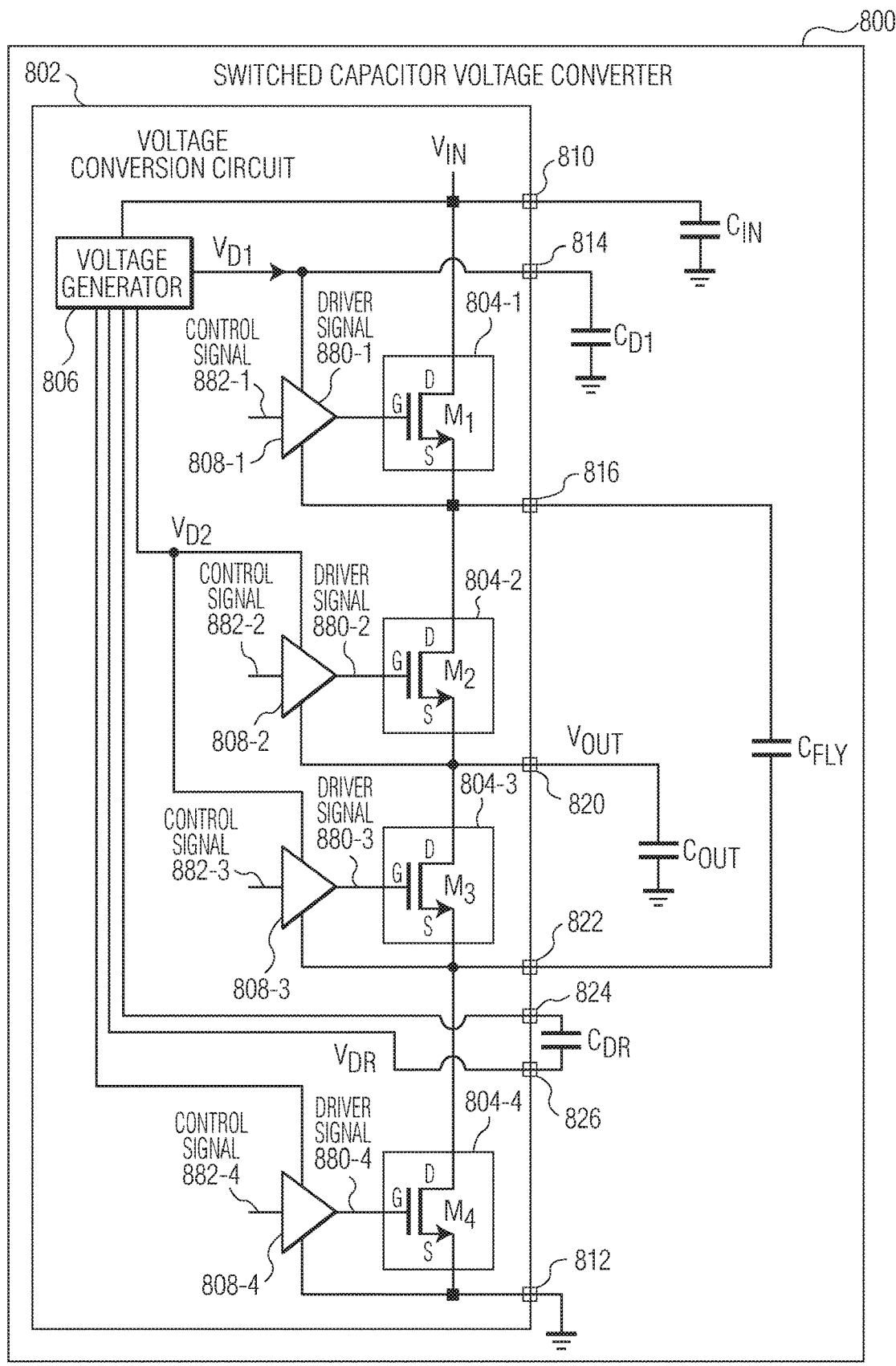
FIG. 8 is a schematic block diagram of a switched capacitor voltage converter in accordance with a third embodiment of the invention.

FIG. 8 is a schematic block diagram of a switched capacitor voltage converter 800 in accordance with a third embodiment of the invention. In the embodiment depicted in FIG. 8, the switched capacitor voltage converter includes a voltage conversion circuit 702, which includes serially connected switching devices 804-1, 804-2, 804-3, 804-4 that are implemented by transistors, M1, M2, M3, M4, a voltage generator 806 connected to the serially connected switching devices, and voltage drivers 808-1, 808-2, 808-3, 808-4, the input capacitor, $C_{IN}$, the flyover capacitor, $C_{FLY}$, an output capacitor, $C_{OUT}$ and driver capacitors, $C_{D1}$, $C_{DR}$. In the embodiment depicted in FIG. 8, the drain terminal, D, of the transistor, M1, is connected to the input voltage, $V_{IN}$, the source terminal, S, of the transistor, M1, is connected to the drain terminal, D, of the transistor, M2, the source terminal, S, of the transistor, M2, is connected to the drain terminal, D, of the transistor, M3, the source terminal, S, of the transistor, M3, is connected to the drain terminal, D, of the transistor, M4, the source terminal, S, of the transistor, M4, is connected to a reference voltage (e.g., ground), the gate terminals, G, of the transistors, M1, M2, M3, M4, are connected to the voltage drivers 808-1, 808-2, 808-3, 808-4. The voltage conversion circuit 802, the switching devices 804-1, 804-2, 804-3, 804-4, the voltage generator 806, and the voltage drivers 808-1, 808-2, 808-3, 808-4 in the embodiment depicted in FIG. 8 are similar to or the same as the voltage conversion circuit 102, the switching devices 104-1, 104-2, 104-3, 104-4, the voltage generator 106, and the voltage drivers 108-1, 108-2, 108-3, 108-4 in the embodiment depicted in FIG. 1. In the embodiment depicted in FIG. 8, a packaged IC device of the voltage conversion circuit 802 includes eight terminals/pins, a $V_{IN}$ (supply voltage) terminal/pin 810, a reference terminal/pin (e.g., GND (ground) terminal/pin) 812, a terminal/pin 814 that is electrically connectable to the driver capacitor, $C_{D1}$, a terminal/pin 816 between the transistors, M1, M2, which is electrically connectable to the flyover capacitor, $C_{FLY}$, a terminal/pin 820 between the transistors, M2, M3, which is electrically connectable to the output capacitor, $C_{OUT}$, a terminal/pin 822 between the transistors, M3, M4, which is electrically connectable to the flyover capacitor, $C_{FLY}$, and terminals/pins 824, 826 that are electrically connectable to the driver capacitor, $C_{DR}$. In the embodiment depicted in FIG. 8, the driver capacitors, $C_{D1}$, $C_{D2}$, and $C_{DR}$, are not directly connected to the N-type transistors, M1, M2, M3, M4, and are not bootstrap capacitors for the N-type transistors, M1, M2, M3, M4. A single-phase switched capacitor voltage converter in which each switching device of a voltage conversion circuit is electrically connected to a separate bootstrap capacitor, three external capacitors and three extra terminals (e.g., pins) are used for the voltage conversion circuit. In contrast, the voltage conversion circuit 802 of the switched capacitor voltage converter 800 depicted in FIG. 8 uses two external driver capacitors, $C_{D1}$, $C_{DR}$, and three terminals/pins for electrical connections to these external driver capacitors, $C_{D1}$, $C_{DR}$. Consequently, compared to a switched capacitor voltage converter in which each switching device of a voltage conversion circuit is electrically connected to a separate bootstrap capacitor, the switched capacitor voltage converter 800 depicted in FIG. 8 uses less external capacitor. Consequently, compared to a switched capacitor voltage converter in which each switching device of a voltage conversion circuit is electrically connected to a separate bootstrap capacitor, the switched capacitor voltage converter 800 depicted in FIG. 8 can have smaller dimension and lower component cost. In addition, compared to the switched capacitor voltage converter 100 depicted in FIG. 1, the switched capacitor voltage converter 800 depicted in FIG. 8 uses one less external driver capacitor, and consequently, one less terminal/pin for electrical connection to the driver capacitor.

Figure 9:
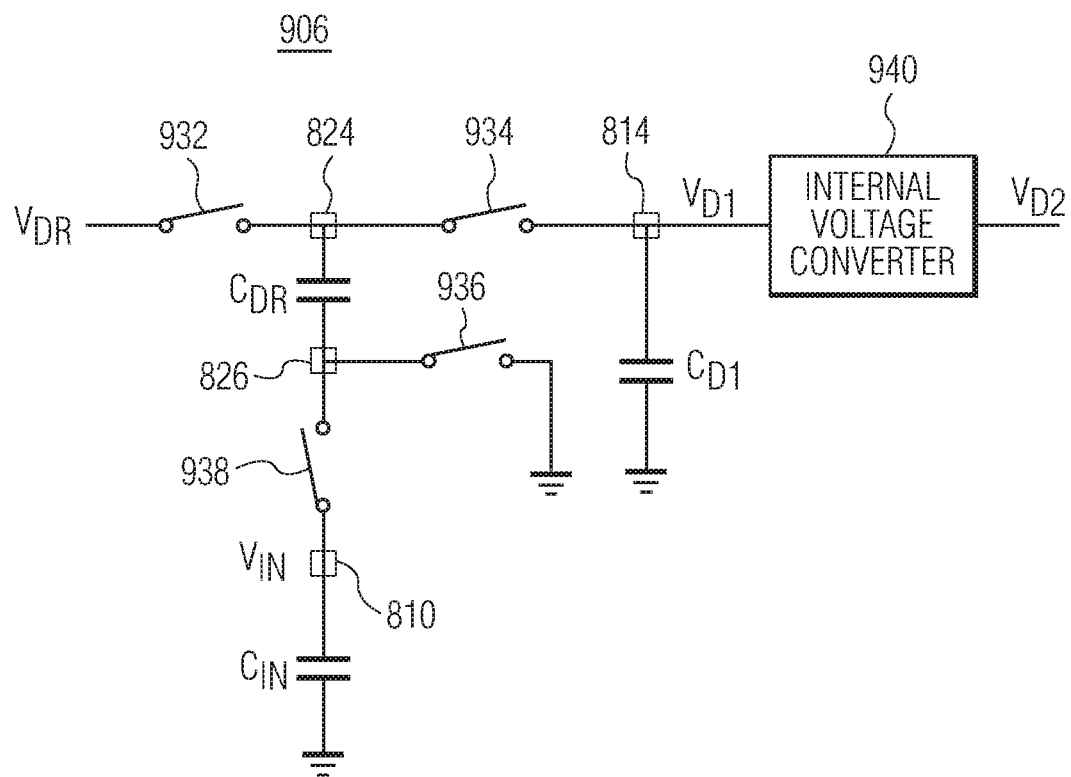
FIG. 9 depicts an embodiment of a voltage generator of the switched capacitor voltage converter depicted in FIG. 8.

FIG. 9 depicts a voltage generator 906, which is an embodiment of the voltage generator 806 depicted in FIG. 8. The voltage generator 906 depicted in FIG. 9 is one possible embodiment of the voltage generator 806 depicted in FIG. 8. However, the voltage generator 806 depicted in FIG. 8 is not limited to the embodiment shown in FIG. 8. In the embodiment depicted in FIG. 9, the voltage generator 906 includes switches 932, 934, 936,938 connected to terminals/pins 810, 814, 824, 826 having the driver voltage, $V_D$ and the input voltage, $V_{D1}$, of the switched capacitor voltage converter. The driver capacitors, $C_{D1}$, and $C_{DR}$, and the input capacitor, $C_{IN}$, are electrically connectable to the terminals/pins 810, 814, 824, 826. The switch 934 is connected to the terminal 814 having the driver voltage, $V_{D1}$, and to the terminal 824. The switch 932 is connected to the terminal 824 and to the driver voltage, $V_{DR}$. The switch 936 is connected to the terminal 826 and to a reference voltage (e.g., ground). The switch 938 is connected to the terminal 826 and to the terminal 810 having the input voltage, $V_{IN}$. The capacitor, $C_{D1}$, is electrically connectable to the terminal 814, and the capacitor, $C_{DR}$, is electrically connectable to the terminals 824, 826. The input capacitor, $C_{IN}$, is electrically connectable to the terminal 810 and a reference voltage (e.g., ground). The switches 932, 934, 936,938 can be controlled to refresh and/or charge at least one of the driver capacitors, $C_{D1}$, and $C_{DR}$, and an internal voltage converter 940. In some embodiments, the voltage generator 906 includes some digital logic configured to control the switches 932, 934, 936,938. In some embodiments, the internal voltage converter is implemented using a clamped voltage generator, linear regulator or other suitable voltage conversion circuit.

Figure 10A:
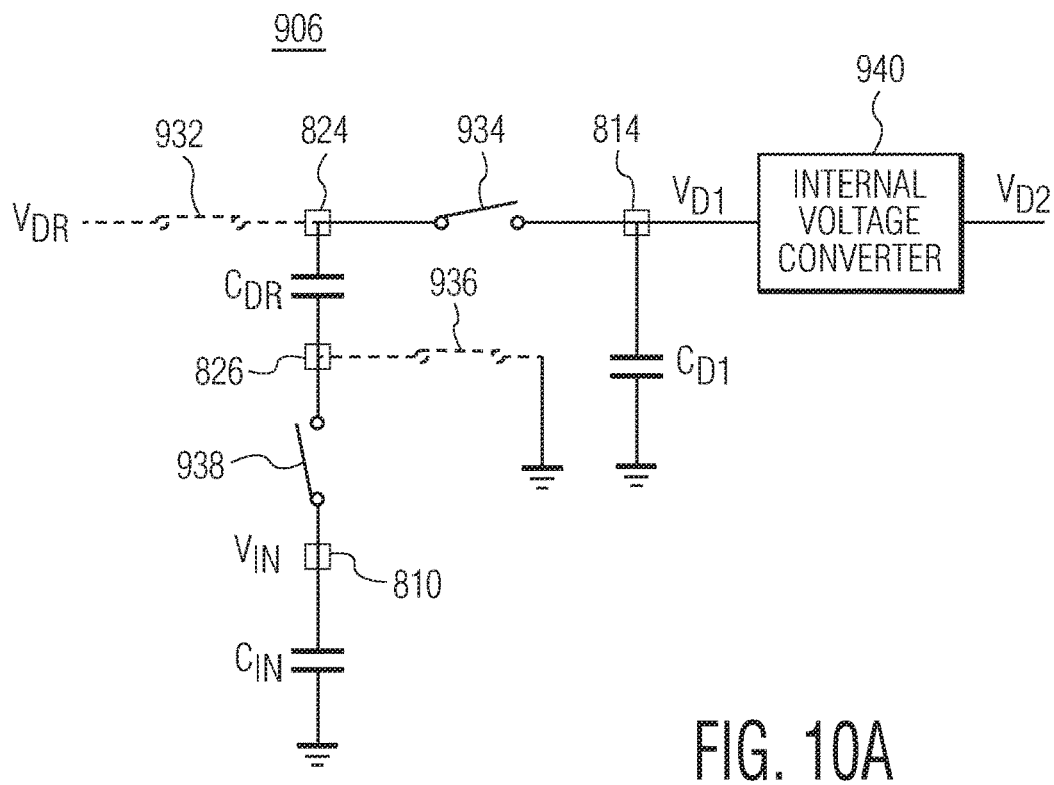
FIGS. 10A and 10B illustrate switching stages/phases of the voltage generator depicted in FIG. 9.
Figure 10B:
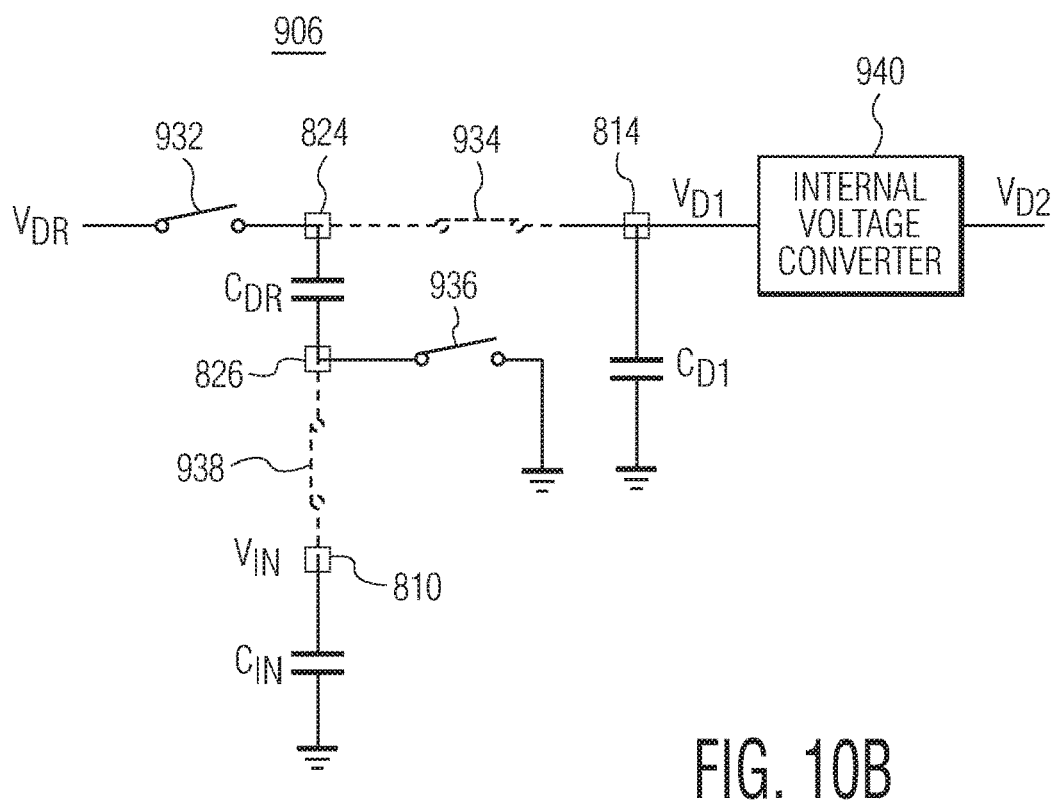

In an example operation of the voltage generator 906, the voltage generator operates in two stages/phases. FIGS. 10A and 10B illustrate the switching stages/phases of the voltage generator depicted in FIG. 9. Specifically, FIG. 10A illustrates a first stage of the voltage generator. In the first stage, the driver capacitor, $C_{DR}$, is refreshed. As illustrated in FIG. 10A, the switches 932, 936 are closed (i.e., conductive) and the switches 934, 938 are open (i.e., non-conductive).

FIG. 10B illustrates a second stage of the voltage generator 206. In the second stage, the driver capacitor, $C_{D1}$, is charged, and the driver voltage, $V_{D2}$, is generated by the internal voltage converter 940. As illustrated in FIG. 10B, the switches 934, 938 are closed (i.e., conductive) and the switches 932, 936 are open (i.e., non-conductive).

Figure 11:
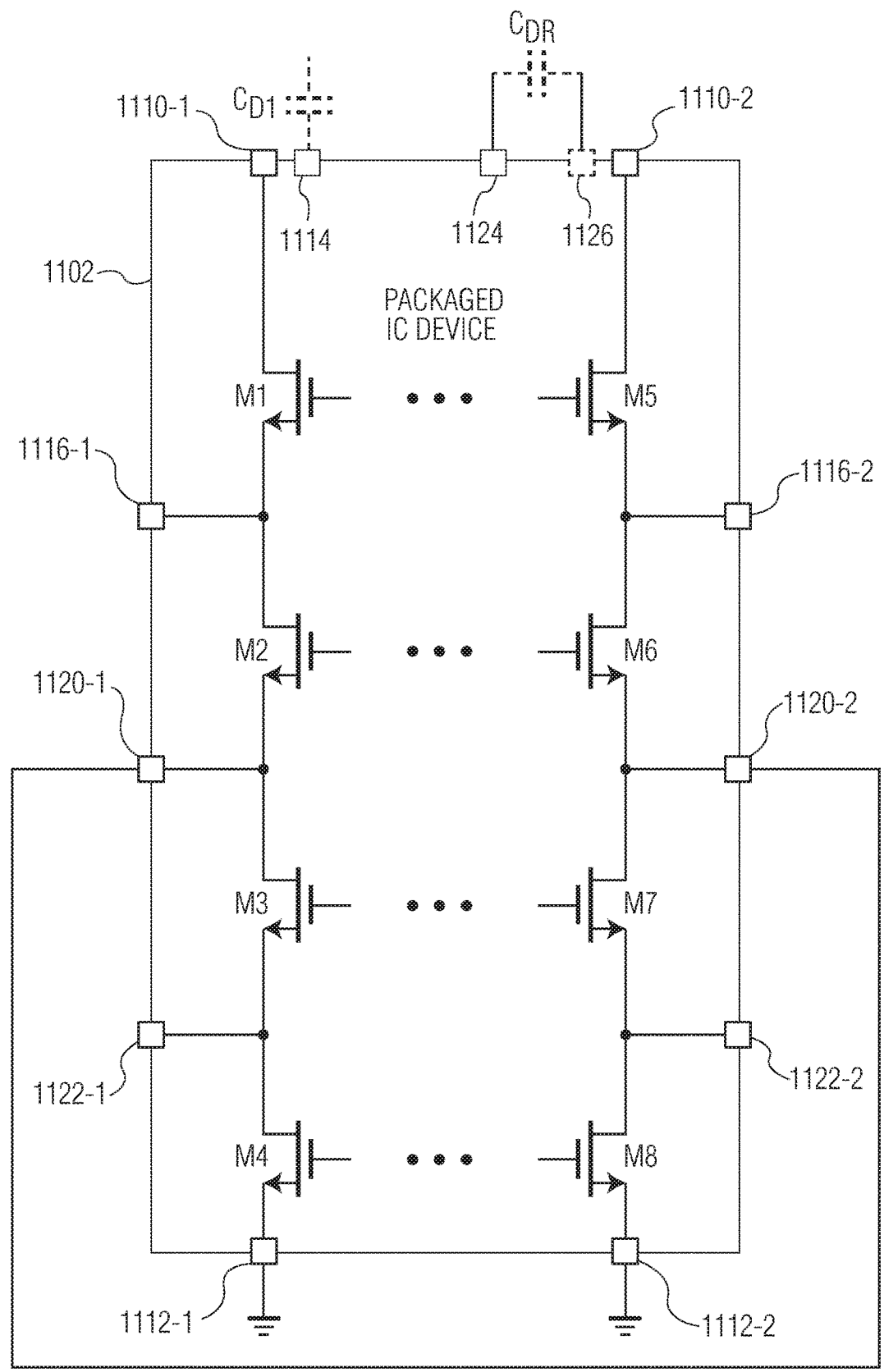
FIG. 11 depicts a terminal/pin configuration of a dual-phase voltage conversion circuit.

For an N-phase (N being a positive integer) switched capacitor voltage converter in accordance with an embodiment of the invention, no bootstrap capacitors are used. Consequently, no terminals/pins are used for electrical connections between bootstrap capacitors and a packaged IC device of an N-phase voltage conversion circuit. For an N-phase voltage conversion circuit in which each switching device is electrically connected to an external bootstrap capacitor, a total of 2N+1 terminals/pins are used for electrical connection to bootstrap capacitors, even if the middle bootstrap capacitor is reused. Consequently, compared to an N-phase voltage conversion circuit in which each switching device is electrically connected to a separate bootstrap capacitor, an N-phase (N being a positive integer) switched capacitor voltage converter in accordance with an embodiment of the invention uses two external capacitors and three terminals/pins for electrical connection to the two external capacitors. FIG. 11 depicts a terminal/pin configuration of a dual-phase voltage conversion circuit 1102 that is embodied as a packaged IC device. As shown in FIG. 11, the packaged IC device of the dual-phase voltage conversion circuit includes twelve terminals/pins, which are two $V_{IN}$ (supply voltage) terminals/pins 1110-1, 1110-2, two GND (ground) terminals/pins 1112-1, 1112-2, a terminal/pin 1116-1 between the transistors, M1, M2, which is electrically connectable to a corresponding flyover capacitor, a terminal/pin 1120-1 between the transistors, M2, M3, which is electrically connectable to a corresponding output capacitor, a terminal/pin 1122-1 between the transistors, M3, M4, which is electrically connectable to the corresponding flyover capacitor, a terminal/pin 1116-2 between the transistors, M5, M6, which is electrically connectable to a corresponding flyover capacitor, a terminal/pin 1120-2 between the transistors, M6, M7, which is electrically connectable to a corresponding output capacitor and may be connected to the terminal/pin 1120-1, a terminal/pin 1122-2 between the transistors, M7, M8, which is electrically connectable to the corresponding flyover capacitor, a terminal/pin 1114 that is electrically connectable to the driver capacitor, $C_{D1}$, and terminals/pins 1124, 1126 that are electrically connectable to the driver capacitor, $C_{DR}$. For a dual-phase voltage conversion circuit in which each switching device is electrically connected to a separate bootstrap capacitor, a total of fifteen terminals/pins and five external bootstrap capacitors are used, even if the middle bootstrap capacitor is reused. In contrast, the dual-phase voltage conversion circuit depicted in FIG. 11 uses thirteen terminals/pins and two external driver capacitors. Consequently, compared to a dual-phase voltage conversion circuit in which each switching device is electrically connected to a separate bootstrap capacitor, the dual-phase voltage conversion circuit depicted in FIG. 11 uses two less terminals/pins and three less external capacitors. Consequently, compared to a dual-phase voltage conversion circuit in which each switching device is electrically connected to a separate bootstrap capacitor, the dual-phase voltage conversion circuit depicted in FIG. 11 can have smaller dimension and lower component cost.

Figure 12:
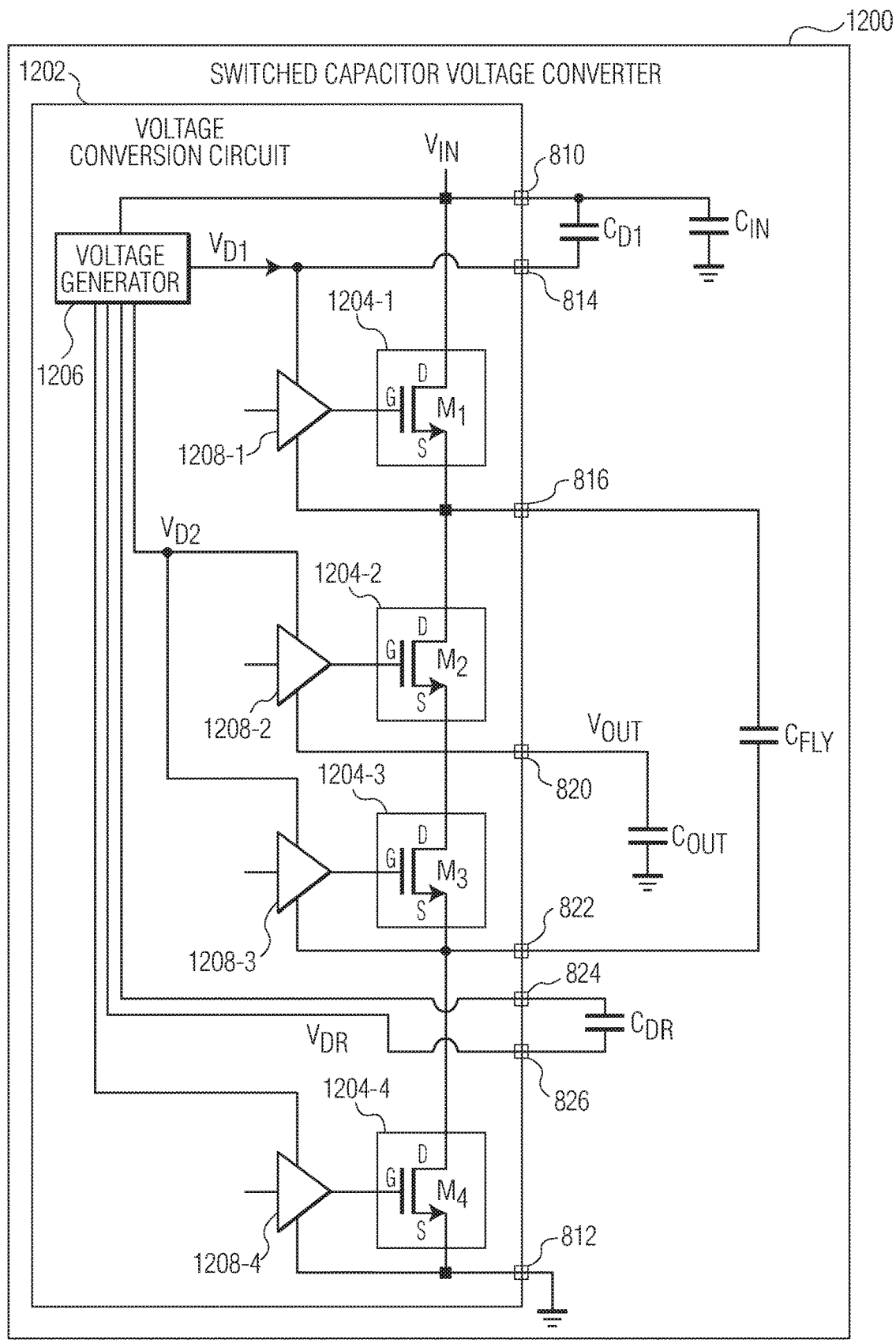
FIG. 12 is a schematic block diagram of a switched capacitor voltage converter in accordance with a fourth embodiment of the invention.

FIG. 12 is a schematic block diagram of a switched capacitor voltage converter 1200 in accordance with a fourth embodiment of the invention. In the embodiment depicted in FIG. 12, the switched capacitor voltage converter includes a voltage conversion circuit 1202, which includes serially connected switching devices 1204-1, 1204-2, 1204-3, 1204-4 that are implemented by transistors, M1, M2, M3, M4, a voltage generator 1206 connected to the serially connected switching devices, and voltage drivers 1208-1, 1208-2, 1208-3, 1208-4, the input capacitor, $C_{IN}$, the flyover capacitor, $C_{FLY}$, an output capacitor, $C_{OUT}$, and the driver capacitors, $C_{D1}$, and $C_{DR}$. The voltage conversion circuit 1202, the switching devices 1204-1, 1204-2, 1204-3, 1204-4, the voltage generator 1206, and the voltage drivers 1208-1, 1208-2, 1208-3, 1208-4 in the embodiment depicted in FIG. 12 are similar to or the same as the voltage conversion circuit 802, the switching devices 804-1, 804-2, 804-3, 804-4, the voltage generator 806, and the voltage drivers 808-1, 808-2, 808-3, 808-4 in the embodiment depicted in FIG. 8. A difference between the switched capacitor voltage converter 1200 depicted in FIG. 12 and the switched capacitor voltage converter 800 depicted in FIG. 8 is that the bottom plate of the driver capacitors, $C_{D1}$, is connected to the input voltage, $V_{IN}$, rather than ground.

Figure 13:
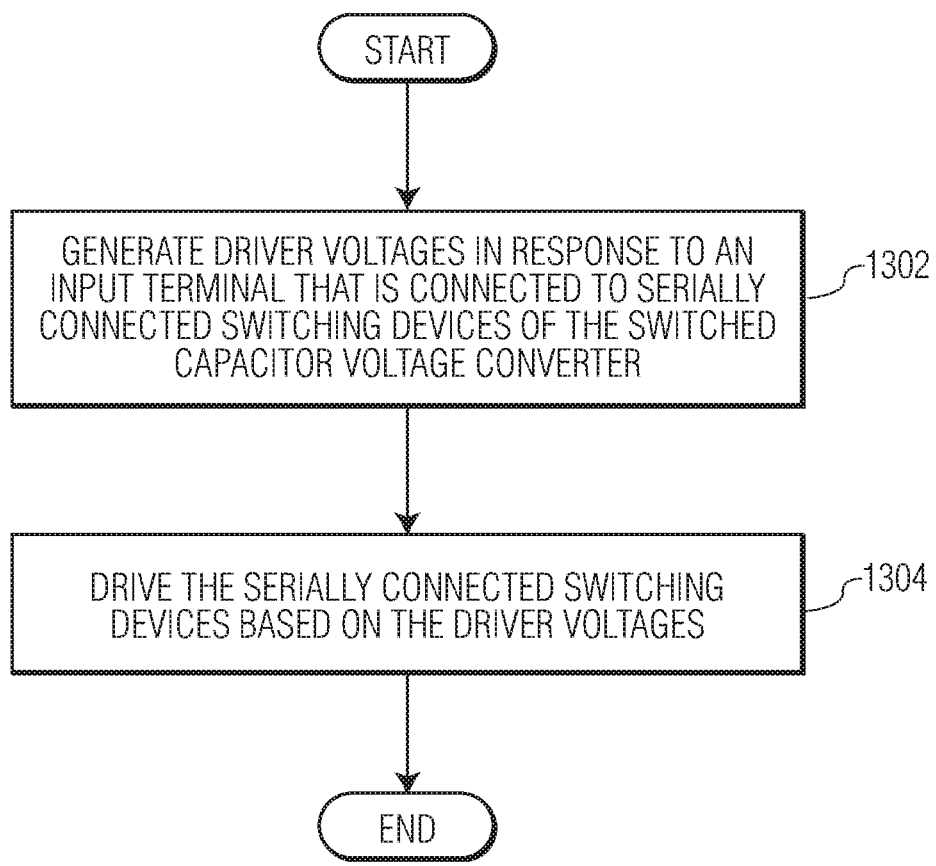
FIG. 13 is a process flow diagram of a method for operating a switched capacitor voltage converter in accordance with an embodiment of the invention.

FIG. 13 is a process flow diagram of a method for operating a switched capacitor voltage converter in accordance with an embodiment of the invention. At block 1302, driver voltages are generate in response to an input voltage at an input terminal that is connected to serially connected switching devices of the switched capacitor voltage converter. At block 1304, the serially connected switching devices are driven based on the driver voltages. The switched capacitor voltage converter may be the same as or similar to switched capacitor voltage converters depicted in FIGS. 1-12.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A switched capacitor voltage converter, the switched capacitor voltage converter comprising:
a plurality of serially connected switching devices;
a voltage generator connected to the serially connected switching devices and configured to generate a plurality of driver voltages in response to an input voltage at an input terminal that is connected to the serially connected switching devices; and a plurality of voltage drivers configured to drive the serially connected switching devices based on the driver voltages; and wherein the voltage drivers comprises, a first voltage driver configured to drive a first switching device of the serially connected switching devices based on a first driver voltage;

second and third voltage drivers configured to drive second and third switching devices of the serially connected switching devices based on a second driver voltage; and a fourth voltage driver configured to drive a fourth switching device of the serially connected switching devices based on a third driver voltage.

2. The switched capacitor voltage converter of claim 1, wherein the voltage generator comprises a plurality of switches connected to a plurality of terminals having the first and second driver voltages, the input voltage, and an output voltage of the switched capacitor voltage converter.

3. The switched capacitor voltage converter of claim 2, wherein the switched capacitor voltage converter further comprises a plurality of capacitors electrically connectable to the terminals.

4. The switched capacitor voltage converter of claim 2, wherein the switches comprise:

a first switch connected to a first terminal having the first driver voltage and to a second terminal;

a second switch connected to a third terminal having the second driver voltage and to the second terminal;

a third switch connected to the second terminal and to the third driver voltage;

a fourth switch connected to a fourth terminal and to a reference voltage;

a fifth switch connected to the fourth terminal and to a fifth terminal having the input voltage; and a sixth switch connected to the fourth terminal and to a sixth terminal having the output voltage.

5. The switched capacitor voltage converter of claim 4, wherein the switched capacitor voltage converter further comprises:

a first capacitor electrically connectable to the first terminal;

a second capacitor electrically connectable to the third terminal; and a third capacitor electrically connectable to the second terminal and to the fourth terminal.

6. The switched capacitor voltage converter of claim 1, wherein the voltage generator comprises a plurality of switches connected to a plurality of terminals having the first driver voltage and the input voltage of the switched capacitor voltage converter.

7. The switched capacitor voltage converter of claim 6, wherein the switched capacitor voltage converter further comprises a plurality of capacitors electrically connectable to the terminals.

8. The switched capacitor voltage converter of claim 6, wherein the switches comprise:

a first switch connected to a first terminal having the first driver voltage and to a second terminal;

a second switch connected to the second terminal and to the third driver voltage;

a third switch connected to a third terminal and to a reference voltage; and a fourth switch connected to the third terminal and to a fourth terminal having the input voltage.

9. The switched capacitor voltage converter of claim 8, wherein the switched capacitor voltage converter further comprises:

a first capacitor electrically connectable to the first terminal;

a second capacitor electrically connectable to the second terminal and to the third terminal; and a third capacitor electrically connectable to the fourth terminal.

10. The switched capacitor voltage converter of claim 1, wherein the first, second, third, and fourth voltage drivers are connected to gate terminals of the first, second, third, and fourth switching devices respectively.

11. A switched capacitor voltage converter, the switched capacitor voltage converter comprising:

a plurality of serially connected N-type transistors;

a voltage generator connected to the serially connected N-type transistors and configured to generate a plurality of driver voltages in response to an input voltage at an input terminal that is connected to the serially connected N-type transistors; and a plurality of voltage drivers configured to drive the serially connected N-type transistors based on the driver voltages; and wherein the voltage drivers comprise:

a first voltage driver configured to drive a first N-type transistor based on a first driver voltage;

second and third voltage drivers configured to drive second and third N-type transistors based on a second driver voltage; and a fourth voltage driver configured to drive a fourth N-type transistor based on a third driver voltage.

12. The switched capacitor voltage converter of claim 11, wherein the voltage drivers are connected to gate terminals of the serially connected N-type transistors respectively.

13. The switched capacitor voltage converter of claim 11, wherein the voltage generator comprises a plurality of switches connected to a plurality of terminals having the first driver voltage and the input voltage of the switched capacitor voltage converter.

14. The switched capacitor voltage converter of claim 13, wherein the switched capacitor voltage converter further comprises a plurality of capacitors electrically connectable to the terminals.

15. The switched capacitor voltage converter of claim 14, wherein the switches comprise:

a first switch connected to a first terminal having the first driver voltage and to a second terminal;

a second switch connected to the second terminal and to the third driver voltage;

a third switch connected to a third terminal and to a reference voltage; and a fourth switch connected to the third terminal and to a fourth terminal having the input voltage.

16. The switched capacitor voltage converter of claim 15, wherein the switched capacitor voltage converter further comprises:

a first capacitor electrically connectable to the first terminal;

a second capacitor electrically connectable to the second terminal and to the third terminal; and a third capacitor electrically connectable to the fourth terminal.

17. A method for operating a switched capacitor voltage converter, the method comprising:
- generating a plurality of driver voltages in response to an input voltage at an input terminal that is connected to a plurality of serially connected switching devices of the switched capacitor voltage converter; and
- driving the serially connected switching devices based on the driver voltages; and
- wherein the driving further comprises,
  - driving a first switching device of the serially connected switching devices based on a first driver voltage;
  - driving second and third switching devices of the serially connected switching devices based on a second driver voltage; and
  - driving a fourth switching device of the serially connected switching devices based on a third driver voltage.

18. The method of claim 17,
- wherein generating the driver voltages in response to the input voltage comprises generating the driver voltages in response to the input voltage using a plurality of capacitors that are not directly connected to the serially connected switching devices.

* * * * *